United States Patent [19]
Jones et al.

[11] Patent Number: 5,319,195
[45] Date of Patent: Jun. 7, 1994

[54] LASER SYSTEM METHOD AND APPARATUS FOR PERFORMING A MATERIAL PROCESSING OPERATION AND FOR INDICATING THE STATE OF THE OPERATION

[75] Inventors: Julian D. C. Jones, Peebleshire; Daoning Su, Edinburgh; Alvaro A. P. Boechat, Sao Paulo; Clive L. M. Ireland, Warwickshire, all of United Kingdom

[73] Assignee: Lumonics Ltd., Warwickshire, United Kingdom

[21] Appl. No.: 857,070

[22] Filed: Mar. 24, 1992

[30] Foreign Application Priority Data

Apr. 2, 1991 [GB] United Kingdom ............... 9106874

[51] Int. Cl.⁵ .............................................. H01J 5/16
[52] U.S. Cl. .......................... 250/227.11; 219/121.62
[58] Field of Search ............ 250/227.11, 227.2, 227.27, 250/227.23, 227.18, 227.21, 205, 227.14; 385/48, 24, 43, 35, 31, 90; 219/121.61, 121.62, 121.83, 121.76

[56] References Cited

U.S. PATENT DOCUMENTS

| 4,311,142 | 1/1982 | Machida .................. 606/12 |
| 4,618,212 | 11/1986 | Ludington et al. .................... 385/98 |
| 4,678,273 | 7/1987 | Vilhelmsson ........................ 385/128 |
| 4,695,697 | 9/1987 | Kosa ................................. 219/121.83 |
| 4,774,406 | 9/1988 | Chollet et al. ................. 250/227.11 |
| 4,812,641 | 3/1989 | Ortiz, Jr. ........................ 250/205 |
| 4,883,054 | 11/1989 | Fuller et al. ............................. 606/2 |
| 4,939,336 | 7/1990 | Meyer et al. .................. 219/121.62 |
| 4,998,043 | 3/1991 | Unami et al. ........................ 250/205 |

FOREIGN PATENT DOCUMENTS

| 0245552A1 | 11/1987 | European Pat. Off. . |
| 0405800A2 | 1/1991 | European Pat. Off. . |
| 0437226A2 | 7/1991 | European Pat. Off. . |
| 4032967A1 | 4/1991 | Fed. Rep. of Germany . |
| WO89/11743 | 11/1989 | PCT Int'l Appl. . |
| 1493660 | 11/1977 | United Kingdom . |
| 1525985 | 9/1978 | United Kingdom . |
| 2021806A | 12/1979 | United Kingdom . |
| 1590082 | 5/1981 | United Kingdom . |
| 2179171A | 2/1987 | United Kingdom . |

OTHER PUBLICATIONS

Abstract of DE-4032967-A1, Apr. 1991.
Fujise et al., "Core Alignments by a Simple Local Monitoring Method" Aug. 1984 vol. 23, No. 15/ Applied Optics pp. 2643-2648.

*Primary Examiner*—David C. Nelms
*Assistant Examiner*—Que T. Le
*Attorney, Agent, or Firm*—Nixon & Vanderhye

[57] ABSTRACT

A laser system comprises a laser (500) whose output beam is delivered to a workpiece (504) by an optical fiber (502). A transducer (506) detects the power of light propagating in the cladding layer of fiber (502) at a position near its input end. The transducer (506) also strips out the light travelling in the cladding layer. The output of transducer (506) is divided by the output of a transducer (507), which detects the power of the output beam of laser (500), to produce a signal indicative of misalignment between the laser beam and the core of fiber (502) at the input face. A transducer (505) comprises a second fiber (508) optically coupled with the cladding layer of fiber (502). Light emitted from the ends of fiber (508) is detected by a pair of detectors (509, 510), whose outputs are indicated on displays (512, 514). Display (512) provides information on the integrity of transmissions of the laser beam through fiber (502). Display (514) provides information on the material processing operation performed on workpiece (504), and also on the focus of the beam onto the workpiece.

17 Claims, 6 Drawing Sheets

LASER SYSTEM METHOD AND APPARATUS FOR PERFORMING A MATERIAL PROCESSING OPERATION AND FOR INDICATING THE STATE OF THE OPERATION

This invention relates to a method of monitoring the state of a material processing operation performed by a laser system, a method of aligning the output beam of a laser with the input end of an optical fiber, a method of focusing the output beam of the optical fiber onto a workpiece, a method of measuring the integrity of transmission of a laser beam through the core of an optical fiber, and to an optical fiber assembly for a laser system.

The advantages of using an optical fiber delivery system for delivering a high power laser beam to a workpiece are well known. These advantages include the ability to scan the laser beam easily over the workpiece, the ability to site the laser remotely from the workpiece, and the ability to distribute power from a central laser to a number of remote workstations. When using an optical fiber to deliver a high power laser beam to a workpiece for performing a materials processing operation, it is desirable to monitor the operating state of the laser system. In particular, it is desirable to monitor the materials processing operation, the coupling efficiency between the laser beam and the input end of the optical fiber, the focus of the output beam of the optical fiber onto the workpiece, and the integrity of transmission of the laser beam between the input and output ends of the optical fiber.

An optical fiber for transmitting a laser beam comprises a core generally surrounded by a transparent outer layer known as a cladding layer. Normally, the cladding layer is surrounded by two further outer layers known as a buffer layer and a jacket. The buffer layer and jacket are provided primarily to protect the core and cladding layer and to give the fiber mechanical strength.

There are two principal types of optical fiber in use at the present time, the step-index fiber and the graded-index fiber. In a step-index fiber, the cladding layer has a lower refractive index than the core. In a graded-index fiber, the refractive index of the core reduces progressively with radial displacement from its axis to the interface with the cladding layer, and the core and the cladding layer have a similar refractive index at the interface. Ideally, in an optical fiber, a laser beam is transmitted along, and contained within, the core. In the case of a step-index fiber, the laser beam is contained within the core as a result of total internal reflection at the interface between the core and the cladding layer and this total internal reflection occurs as a result of the difference in refractive index between the core and the cladding layer. In the case of a graded-index fiber, the laser beam is contained within the core by virtue of the radial variations of the refractive index within the core.

It is desirable to monitor a material processing operation carried out by a high power laser which uses an optical fiber to deliver its output beam. A material processing operation may comprise a number of phases, for example a surface breakdown phase, and a penetration phase prior to cutting and drilling. It is useful to obtain a signal which can indicate the completion of each phase and can be used in the control of the laser. Alternatively, such a signal could, by its "signature" or waveform, indicate the extent to which laser parameters are optimized for each phase.

It is important to ensure that the optical beam of the optical fiber is accurately focused with respect to the part of the workpiece which is being processed. If the output beam of the optical fiber is not accurately focused with respect to the workpiece, intense light may be reflected or scattered back from the workpiece onto the output end of the optical fiber outside the core and, consequently, cause damage to the optical fiber.

At the input end of an optical fiber, it is important to achieve a very high efficiency of coupling between a laser beam and the core of the fiber. If a significant proportion of a high power laser beam is incident on the fiber outside the core, it is likely to cause damage to the fiber and surrounding material.

It is therefore desirable to monitor the coupling efficiency between the laser beam and the optical fiber. In a direct technique for measuring coupling efficiency, the power of the output beam from the optical fiber is measured. The power of the output beam represents the power of light propagating in the core of the optical fiber at its output end. Although it is comparatively easy to measure the power of the output beam from the optical fiber when setting up the laser system, it is inconvenient to measure this power when the system is in use. A further disadvantage of the direct technique is that it measures the combination of coupling efficiency and transmission efficiency rather than the coupling efficiency alone. When the laser system is being used, the transmission efficiency can vary, for example due to bending losses, and so accurate evaluation of the coupling efficiency will not be achieved. In order to measure the coupling efficiency alone, it would be necessary to measure the power in the core of the fiber at a position adjacent the input end but such a measurement is not possible without interrupting the fiber.

It is also important to achieve high integrity of transmission of a high power laser beam between the input and output ends of an optical fiber. If a significant proportion of the laser beam is lost from the core, it is likely that it will cause damage. There are various mechanisms by which integrity can be impaired.

According to a first aspect of this invention, there is provided in a laser system which is performing a material processing operation on a workpiece and which includes a laser, an optical fiber comprising a core and at least one outer layer and having an input end and an output end, means for coupling the output beam of the laser with the input end of the optical fiber, and means for directing the output beam of the optical fiber onto a workpiece, a method of monitoring the state of the material processing operation, said method comprising the steps of detecting the power of light propagating in an outer layer of the optical fiber from the output end towards the input end at a position between the output end and the input end, and producing an output signal indicative of the magnitude of said power, said output signal indicating the state of the material processing operation.

According to a second aspect of this invention, there is provided a laser system for performing a material processing operation on a workpiece comprising a laser, an optical fiber comprising a core and at least one outer layer and having an input end and an output end, means for coupling the output beam of the laser with the input end of the optical fiber, means for directing the output beam of the optical fiber onto a workpiece, means for detecting the power of light propagating in an outer layer of the optical fiber from the output end towards the input end at a position between the output end and the input end, and means responsive to said detecting means for producing an output signal indicative of said power, said output signal indicating the state of the material processing operation.

According to a third aspect of this invention, there is provided in a laser system which is performing a material processing operation, a workpiece and which includes a laser, an optical fiber comprising a core and at least one outer layer and having an input end and an output end, means for coupling the output beam of the laser with the input end of the optical fiber, and means for directing the output beam of the optical fiber onto a workpiece, a method of focusing the output beam of the optical fiber with respect to the workpiece, said method comprising the steps of detecting the power or light propagating in an outer layer of the optical fiber from the output end towards the input end at a position between the output end and the input end, producing an output signal indicative of the magnitude of said power, and adjusting the focus position of the output beam of the optical fiber in accordance with said output signal.

According to a fourth aspect of this invention, there is provided a laser system for performing a material processing operation on a workpiece comprising a laser, an optical fiber comprising a core and at least one outer layer and having an input end and an output end, means for coupling the output beam of the laser with the input end of the optical fiber, means for detecting the power of light propagating in an outer layer of the optical fiber from the output end towards the input end at a position between the output end and the input end, means responsive to said detecting means for producing an output signal indicative of said power, and means responsive to said output signal for focusing the output beam of the optical fiber with respect to a workpiece.

According to a fifth aspect of this invention, there is provided in a laser system including a laser, an optical fiber comprising a core and at least one outer layer and having an input end and an output end, and means for coupling the output beam of the laser with the input end of the optical fiber, a method of aligning said output beam with the input end of the optical fiber, said method comprising the steps of detecting the power of light propagating in the outer layer of the optical fiber at a position adjacent the input end of the optical fiber, producing a first signal indicative of the magnitude of said power at said position, detecting the power of the output beam of the laser between the laser and the input end of the optical fiber, producing a second signal indicative of the magnitude of said power of the laser beam, dividing said first signal by said second signal to produce a ratio signal, and adjusting the alignment of the laser beam with the input end of the optical fiber so as to minimize said ratio signal.

According to a sixth aspect of this invention, there is provided a laser system comprising a laser, an optical fiber comprising a core and at least one outer layer and having an input end and output end, means for coupling the output beam of the laser with the input end of the optical fiber, first detecting means for detecting the power of light propagating in an outer layer of the optical fiber at a position adjacent the input end of the optical fiber, means responsive to said first detecting means for producing a first signal indicative of the magnitude of said power at said position, second detecting means for detecting the power of light of the output beam of the laser between the laser and the input end of the optical fiber, means responsive to said second detecting means for producing a second signal indicative of the magnitude of said power of the laser beam, and means for dividing said first signal by said second signal to produce a ratio signal which is indicative of the alignment of the laser beam with the input end of the optical fiber.

According to a seventh aspect of this invention, there is provided in a laser system including a laser, an optical fiber comprising a core and at least one outer layer and having an input end and output end, and means for coupling the output beam of the laser with the input end of the optical fiber, a method of measuring the integrity of transmission of the laser beam through the core between the input and output ends of the optical fiber, said method comprising the steps of detecting the power of light propagating in an outer layer of the optical fiber at a downstream position which is remote from the input end of the optical fiber with a transducer located at said downstream position, and producing an output signal indicative of the magnitude of said power at said downstream position, said output signal indicating the transmission integrity.

According to an eighth aspect of this invention, there is provided a laser system comprising a laser, an optical fiber comprising a core and at least one outer layer and having an input end and an output end, means for coupling the output beam of the laser with the input end of the optical fiber, a transducer located at a downstream position which is remote from the input end of the optical fiber and arranged to detect the power of light propagating in an outer layer of the fiber at said downstream position, and means responsive to said transducer for producing an output signal indicative of the magnitude of said power at said downstream position, said output signal indicating the transmission integrity.

According to a ninth aspect of this invention, there is provided an assembly comprising an optical fiber having a core, at least one outer layer, an input end and an output end, and a transducer for measuring the power and direction of light propagating in an outer layer of the optical fiber, said transducer comprising a second optical fiber optically coupled with said outer layer, and an optical detector positioned to detect light emitted from one end of the second optical fiber.

According to a tenth aspect of this invention, there is provided a laser system for performing a material processing operation on a workpiece comprising a laser, a main optical fiber comprising a core and at least one outer layer and having an input end and an output end, means for coupling the output beam of the laser with the input end of the main optical fiber, means for directing the output beam of the main optical fiber onto a workpiece, a transducer mounted on said optical fiber at a position between the output end and the input end for measuring the power of light propagating in an outer layer of the main optical fiber, said transducer comprising a second optical fiber aligned and coupled with said outer layer of the main optical fiber, first and second optical detectors positioned to detect light emitted from first and second ends of the second optical fiber, first signal producing means responsive to said first detector for producing an output signal indicative of the power of light propagating in the outer layer of the main fiber at the position of the transducer from the output end of the main optical fiber towards its input end, and second signal producing means responsive to the second optical detector for producing an output signal indicative of the power of light propagating in the outer layer of the main fiber at the position of the transducer from the input end of the main optical fiber towards its output end.

According to an eleventh aspect of this invention, there is provided a laser system for performing a material processing operation on a workpiece comprising a laser, a controller for the laser system, an optical fiber comprising a core and at least one outer layer and having an input end and an output end, means for coupling the output beam of the laser with the input end of the main optical fiber, means for directing the output beam of the optical fiber onto a workpiece, first detecting means for detecting the power of light propagating in an outer layer of the optical fiber from the output end towards the input end, said first detecting means producing a first output signal, second detecting means for detecting the power of light propagating in an outer layer of the optical fiber from the input end towards the output end at a position which is downstream and remote from the input end of the optical fiber, said second detecting means producing a second output signal, and third detecting means for detecting the power of light propagating in an outer layer of the optical fiber at a position adjacent the input end of the optical fiber, said third detecting means producing a third output signal, said first, second and third output signals being supplied to the controller for the laser system.

This invention will now be described in more detail, by way of example, with reference to the drawings in which.

Figure 1:
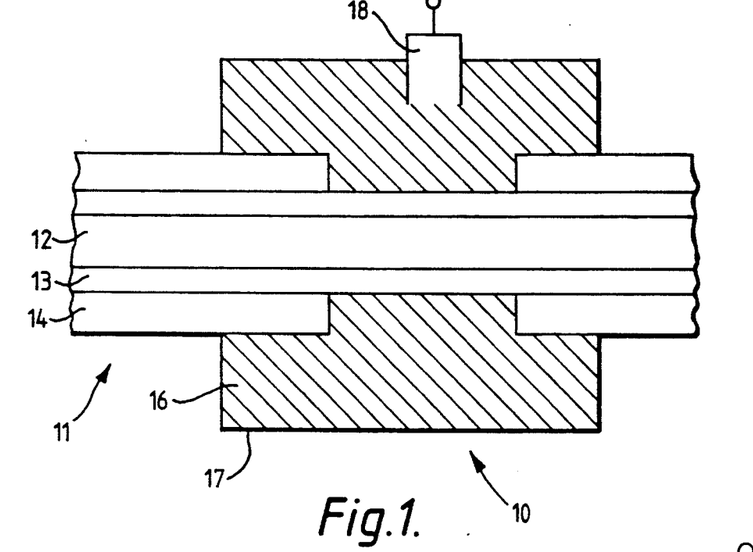
FIG. 1 is a diagrammatic cross-sectional view of a transducer for measuring the power of light propagating in the cladding layer of an optical fiber.

Referring now to FIG. 1, there is shown a transducer 10 for measuring the power of light propagating in the cladding layer of a step-index optical fiber 11.

The fiber 11 comprises a core 12 surrounded by three outer layers, namely, a cladding layer 13, a buffer layer 14 and a jacket, not shown. The core 12 and cladding layer 13 are formed from fused silica although other materials may be used. The cladding layer is doped so as to create a difference between the refractive indices of the core and the cladding layer. This difference in refractive indices causes light propagating along the core to be totally internally reflected at the interface between the core and the cladding layer. The buffer layer 14 is, as usual, formed from silicone rubber and the jacket is formed from a plastics material such as nylon. In each of the laser system which are described below, the optical fiber has a construction similar to that of optical fiber 11.

In the vicinity of the transducer 10, the buffer layer 14 and the jacket are removed. The transducer 10 comprises a mass of material 16 which surrounds the cladding layer 13. The mass of material has a refractive index which closely matches that of cladding layer 13. The material 16 may take the form of a liquid, gel or other material. In the present example, material 16 is a liquid held in a cell 17. An optical detector in the form of a photodiode 18 is mounted on cell 17 so that its light sensing face is in contact with liquid 16.

In operation, the liquid 16 strips light out of the cladding layer 13. Consequently, immediately downstream from the transducer 10, the amount of light propagating in the cladding layer 13 will be negligible. The photodiode 18 senses the light which is stripped out of the cladding layer 13 and propagates through liquid 16. Thus, at the output of the photodiode 18, there is produced a signal which is proportional to, and indicates the magnitude of, the power of the light propagating in the cladding layer 13 immediately upstream of the transducer 10.

Figure 2:
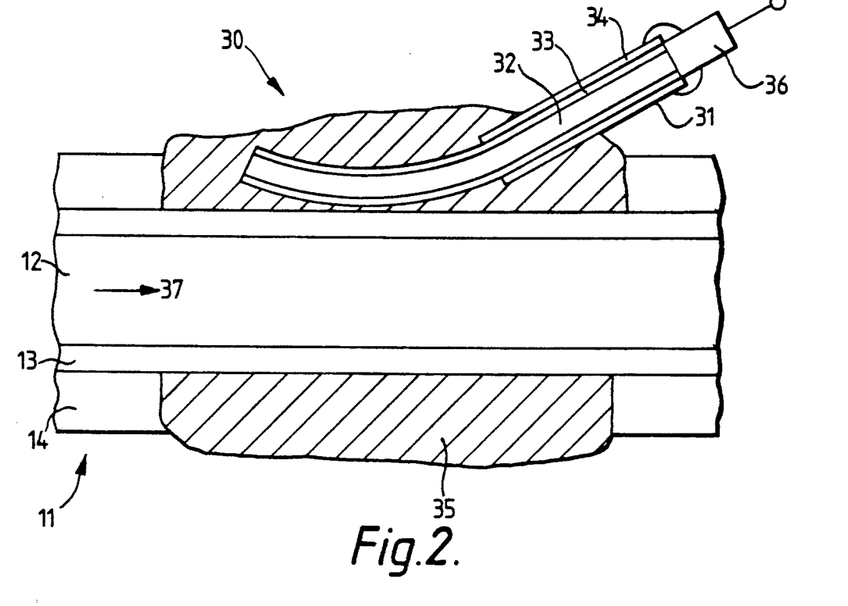
FIG. 2 is a diagrammatic cross-sectional view of a transducer for measuring the power of light propagating in one direction in the cladding layer of an optical fiber.

Referring now to FIG. 2, there is shown another transducer 30 for measuring the power of light propagating in the cladding layer of fiber 11. In the vicinity of transducer 30, the buffer layer 14 and the jacket are removed. The transducer 30 comprises an optical fiber 31, which has a diameter much smaller than that of fiber 11, and an optical detector in the form of a photodiode 36 attached to one end of fiber 31. The fiber 31 has a core 32, a cladding layer 33 and a buffer layer 34. The buffer layer 34 is removed over a portion of fiber 31 adjacent its other end. By way of modification, the cladding layer 33 may also be removed over this portion. This portion of fiber 31 is placed in close proximity to the cladding layer 13 of fiber 11 and secured in position by a mass of material in the form of optical cement 35. The cement 35 is transparent and its refractive index closely matches that of cladding layer 13.

In operation, the cement 35 strips out light propagating in the cladding layer 13 regardless of the direction of propagation. The photodiode 36 detects light which was propagating in the cladding layer predominantly in the direction indicated by arrow 37.

Figure 3:
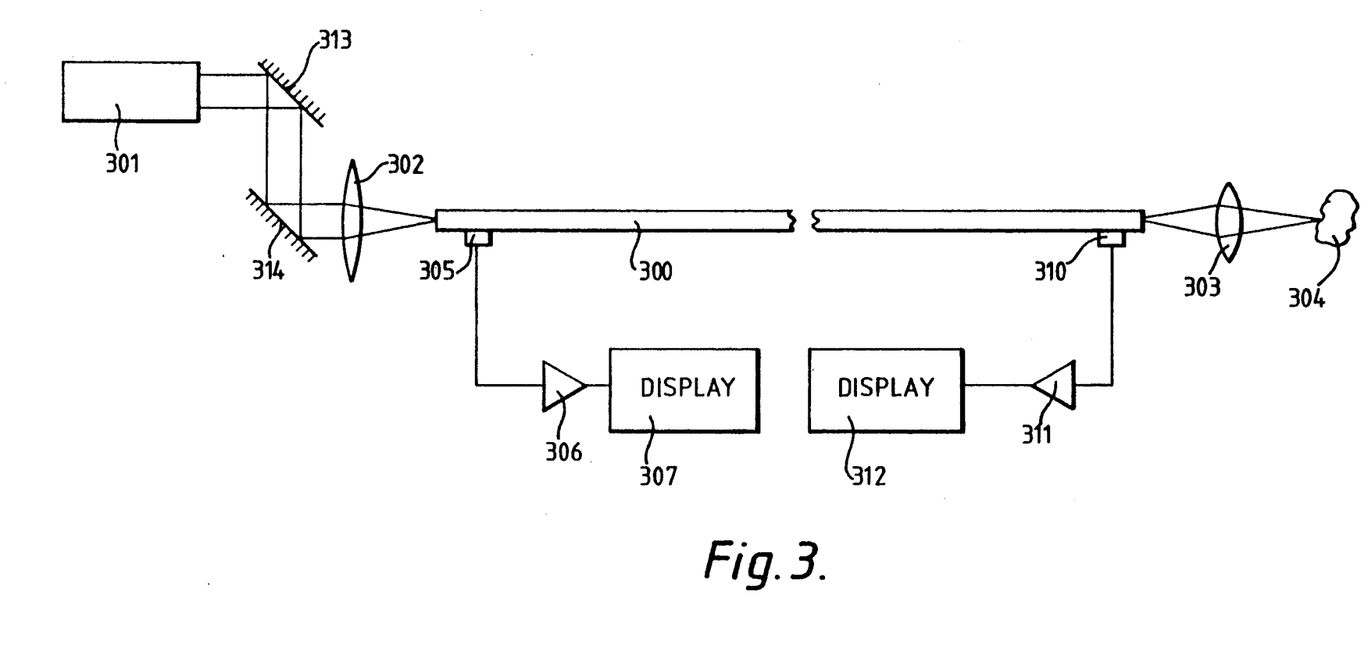
FIG. 3 is a diagrammatic view of part of a laser system which includes an arrangement for monitoring the integrity of transmission along an optical fiber.

Referring now to FIG. 3, there is shown a laser system which includes an arrangement for monitoring the alignment between a laser beam and an optical fiber 300, and an arrangement for monitoring the integrity of transmission through fiber 300. The laser system includes a high power Nd:YAG laser 301. By way of example, laser 301 may be a JK 701 Nd:YAG laser produced by Lumonics Ltd, Rugby, England. This laser produces a beam having a maximum mean power of 400 W. The output beam of laser 301 is directed by mirrors 313 and 314 and by a lens 302 onto the input face of fiber 300. The output beam from fiber 300 is focused by a lens 303 onto a workpiece 304 to perform a material processing operation, such as cutting or drilling.

The arrangement for monitoring the alignment includes a transducer 305 which is identical to transducer 10 of FIG. 1 or the transducer 30 of FIG. 2. The output of transducer 305 is connected to the input of an amplifier 306, the output of which is connected to the input of a display 307. The output of display 307 indicates the magnitude of the misalignment between the laser beam and the core of the fiber at its input end and may be used to align the output beam of laser 301 with the input face of fiber 300. The transducer 305 strips out the light propagating in the cladding layer.

As has been mentioned above, the integrity of the transmission between the input and output ends of an optical fiber can be impaired by various mechanisms. These include bending losses, scattering due to optical imperfections in the fiber core and losses due to fiber warming. The lost light passes from the core into the cladding layer.

The arrangement for monitoring the integrity of transmission includes a transducer 310 located adjacent to the output end of fiber 300. Transducer 310 is identical to transducer 10 of FIG. 1 or the transducer 30 of FIG. 2. The output of transducer 310 is connected to the input of an amplifier 311, and the output of amplifier 311 is connected to the input of a display 312.

As the transducer 305 strips light out of the cladding layer, light propagating in the cladding layer immediately upstream of transducer 310 has reached the cladding layer as a result of transmission losses from the core between the transducers 305 and 310. Thus display 312 provides an indication of the magnitude of the impairment of the transmission integrity of fiber 300 between the input and output ends.

The output signal of amplifier 311 may also be used to generate a cut-out signal for laser 301 in the event that it exceeds a threshold value. The control system may also control a robotic device which moves the output end of fiber 300, and hence controls the bending of fiber 300.

The sensitivity of evaluating coupling efficiency by measuring cladding power is greater by a factor of 100 or more than the sensitivity which can be achieved by measuring core power. Likewise, the sensitivity of evaluating transmission integrity by measuring cladding power is much greater than the sensitivity which can be achieved by measuring core power. In the case of transmission integrity, a small fractional loss of power from the core causes a large fractional increase of power in the cladding layer.

Figure 4:
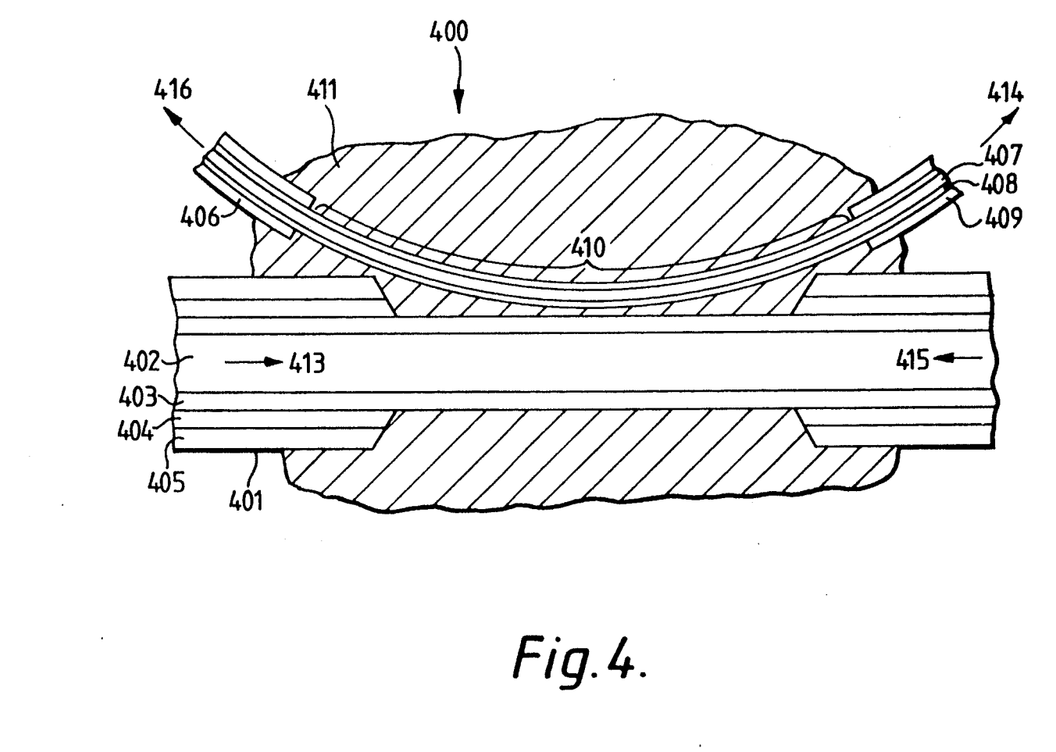
FIG. 4 is a diagrammatic view of a transducer for measuring both the power and direction of propagation of light in a cladding layer of an optical fiber.

Referring now to FIG. 4, there is shown a transducer 400 for measuring the power of light propagating in the cladding layer 403 of an optical fiber 401. The fiber 401 comprises a core 402, the cladding layer 403, a buffer layer 404 and a jacket 405. In the vicinity of transducer 400, a portion of the buffer layer 404 and the jacket 405 is removed.

The transducer 400 comprises an optical fiber 406 which has a diameter which, in the present example, is much smaller than that of fiber 401. The fiber 406 has a core 407, a cladding layer 408 and a buffer layer 409. Section 410 of fiber 406 has its buffer layer 409 removed. This section 410 is in close proximity with the cladding layer 403 of fiber 401 along the portion where the buffer layer 404 and the jacket 405 have been removed. The two fibers 401 and 406 are held together by a mass of material 411. In the present example, the material 411 comprises an optical cement, the refractive index of which matches that of the cladding layer 403

Although not shown in FIG. 4, each end of fiber 406 is provided with a photodiode which is positioned to detect light emitted from the fiber.

In operation, if light propagates along fiber 401 inside the cladding layer 403 in the direction indicated by arrow 413, a fraction of this light will enter fiber 406 and propagate along it in the direction indicated by arrow 414. The light propagating along fiber 406 in the direction of arrow 414 will be detected by the photodiode located at the right hand end of fiber 406 as viewed in FIG. 4. Likewise, if light propagates along fiber 401 inside the cladding layer 403 in the direction indicated by arrow 415, a fraction of this light will enter fiber 406 and propagate along it in the direction indicated by arrow 416. The light propagating along fiber 406 in the direction of arrow 416 will be detected by the photodiode located at the left hand end of fiber 406. Thus the transducer 400 can detect light propagating in the cladding layer 403 of fiber 401 and also the direction of propagation.

In the transducer 400, the fibers 401 and 406 are optically coupled together by the material 411. By way of modification, the material 411 may be omitted and another technique used to couple the fibers together. For example, the fibers may be clamped together so as to bring them into intimate contact with each other. Where this technique is used, coupling may be improved by polishing or etching one or both of the fibers. In another technique optical coupling may be achieved by fusing the fibers together.

The transducer 400 may be used for detecting coupling efficiency and transmission integrity using the methods described with reference to FIG. 3.

Figure 5:
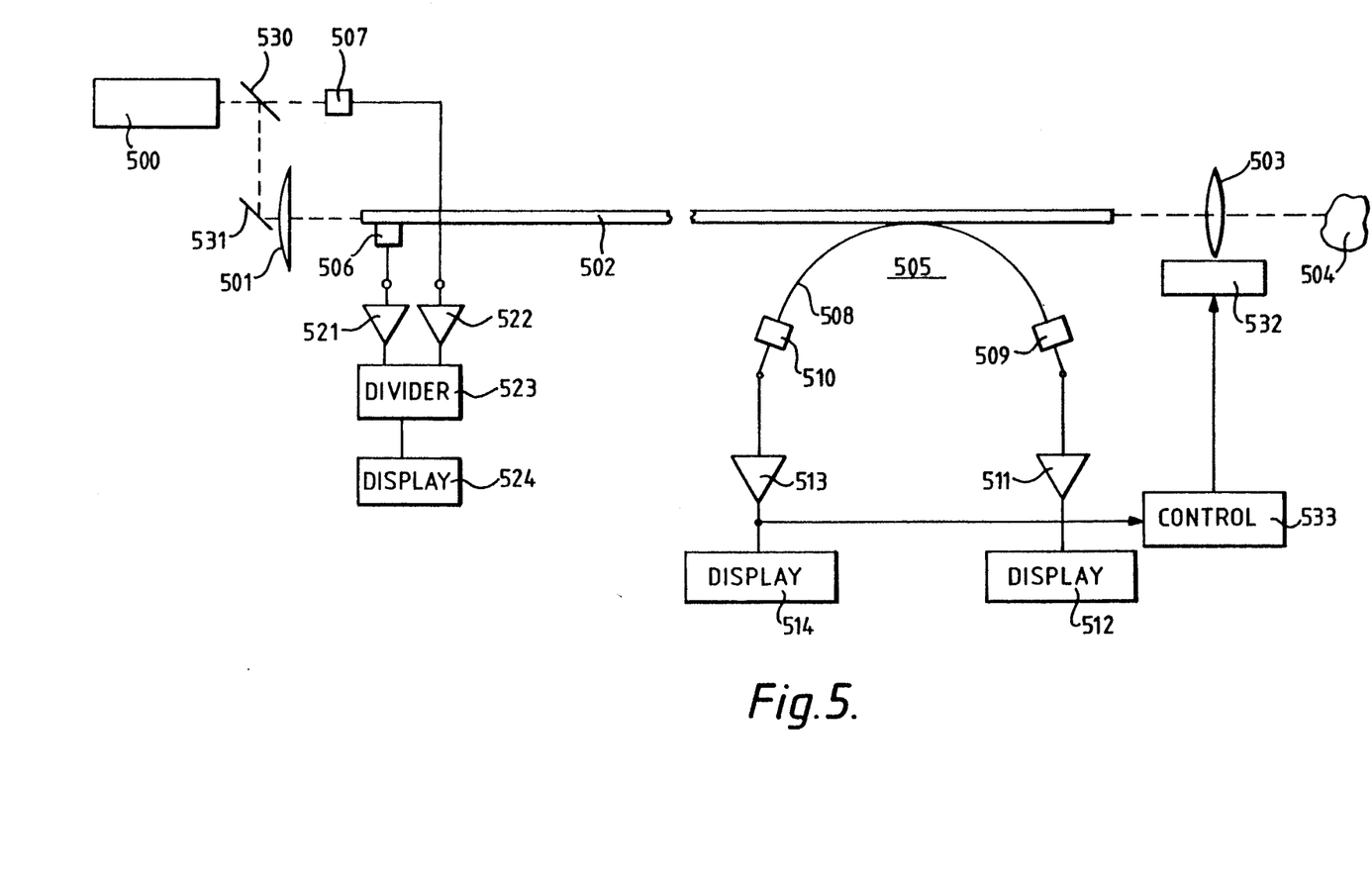
FIG. 5 is a diagrammatic view of a laser system which includes an arrangement which monitors the misalignment between a laser beam and an optical fiber, the integrity of transmission of the laser beam along the optical fiber, the focus of the output beam of the optical fiber onto the workpiece, and a material processing operation.

Referring now to FIG. 5, there is shown a laser system which includes an arrangement for monitoring coupling efficiency, and a combined arrangement for monitoring transmission integrity and a material processing operation and also for monitoring and adjusting the focus of the beam onto a workpiece. The laser system includes a high power Nd:YAG laser 500, which may also be a JK 701 Nd:YAG laser produced by Lumonics Ltd. The output beam of laser 500 is directed by mirrors 530 and 531 and focused by a lens arrangement diagrammatically indicated as a lens 501 onto the input face of an optical fiber 502. The mirror 530 reflects 98% of the light incident thereon and the mirror 531 is fully reflecting. The output beam from fiber 502 is focused by a lens 503 onto a workpiece 504 to perform a materials processing operation such as welding or drilling. The position of lens 503 may be adjusted by a motor 532.

The arrangement for monitoring coupling efficiency comprises a transducer 506 located adjacent the input end of fiber 502. The transducer 506 is identical to the transducer 10 of FIG. 1 or the transducer 30 of FIG. 2. A transducer 507, which is a photodetector such a photodiode, is located behind mirror 530. The outputs of transducers 506, 507 are connected to the inputs of a pair of amplifiers 521, 522. The outputs of amplifiers 521, 522 are connected to the inputs of a divider 523. The divider 523 divides the output signal of transducer 506 by the output of transducer 507 to provide a ratio signal. The output of divider 523 is connected to the input of a display 524.

In operation, the output of transducer 506 is proportional to, and indicates the magnitude of, the power of light propagating in the cladding layer of fiber 502 immediately upstream from itself. The transducer 506 strips light out of the cladding layer. Consequently, there is a negligible amount of light propagating in the cladding layer immediately downstream of transducer 506. The output of transducer 507 indicates the magnitude of the power of the output beam of laser 500. As a result of dividing the output signal of transducer 506 by the output signal of transducer 507, the output of divider 523 represents a normalised value for the power of light propagating in the cladding layer. The normalised value may be obtained by reading display 524. The power of light propagation in the cladding layer adjacent the input end of a fiber provides an accurate measurement of the magnitude of the misalignment between a laser beam and the core of an optical fiber.

In order to align the output beam of laser 500 with the core of fiber 502, the alignment is adjusted so as to minimize the reading on display 524. Alignment may be achieved by adjusting the axial and transverse positions and orientation of the input end of fiber 502 relative to the laser beam. Accordingly, the spot size of the laser beam may be closely matched to the diameter of the core of fiber 502. Also, the output signal of divider 523 may be used as an input signal for a control system which automatically adjusts and maintains the alignment between the laser beam and the fiber.

The combined arrangement for monitoring transmission integrity and the material processing operation and for monitoring and adjusting the focus of the laser beam onto the workpiece includes a transducer 505 identical to the transducer 400 of FIG. 4. Transducer 505 has an optical fiber 508. The ends of fiber 508 are provided with optical detectors in the form of photodiodes 509, 510.

The photodiode 509 detects light propagating along fiber 502 in the cladding layer towards the output end. Such light is present as a result of impairment of transmission integrity. The output of photodiode 509 is connected to the input of an amplifier 511 and the output of amplifier 511 is connected to the input of a display 512. Thus, the display 512 indicates the magnitude of the power of light propagating in the cladding layer of fiber 502 towards the output end. The magnitude also corresponds to the degree of impairment of the transmission integrity.

The photodiode 510 detects light propagating along fiber 502 inside the cladding layer from the output end towards the input end. Such light is present as a result of light which radiates or is reflected or scattered from the workpiece 504 and is incident on the output end of fiber 502. The output of photodiode 510 is connected to the input of an amplifier 513, and the output of amplifier 513 is connected to the input of a display 514. Thus, the display 514 indicates the magnitude of the power of light propagating in fiber 502 from the output end towards the input end. It follows that display 514 provides quantitative information about the material processing state and such information can be used to control laser 500.

Figure 6A:
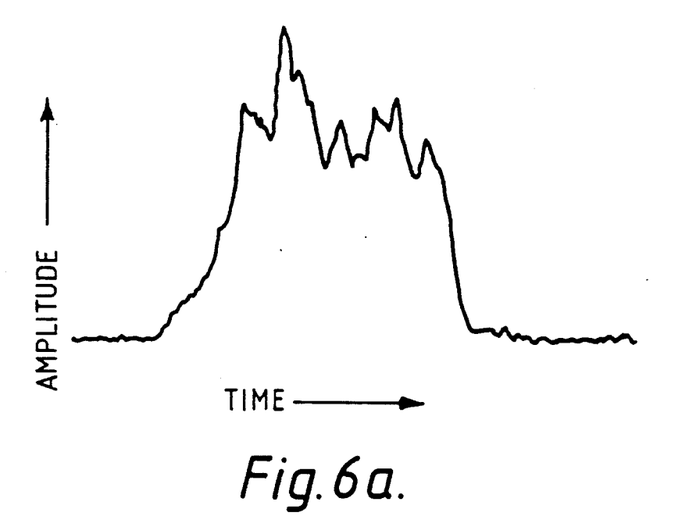
FIGS. 6(a) and 6(b) are graphs obtained from a transducer monitoring a material processing operation.
Figure 6B:
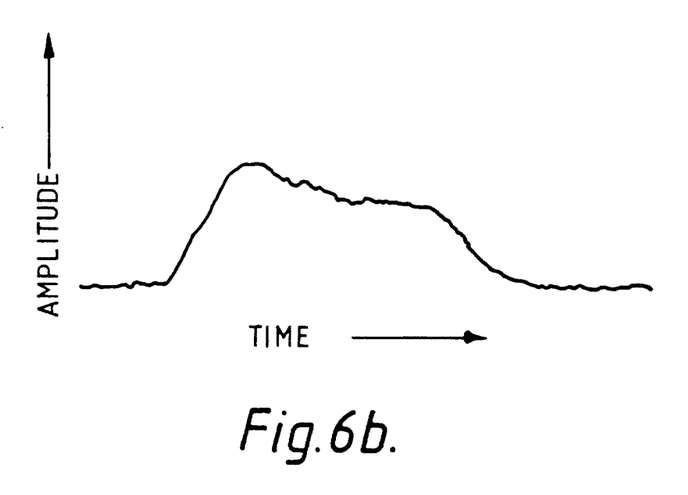

Referring to FIGS. 6(a) and 6(b), there are shown two graphs of the output signal of amplifier 513 which were obtained during a cutting operation on a workpiece. Each graph represents the output signal during a single light pulse from laser 500. In the case of the graph of FIG. 6(a), the workpiece was moved at a rate of 400 mm/minute and it was found that satisfactory cutting had not occurred. In the case of the graph of FIG. 6(b), the workpiece was traversed at a rate of 300 mm/minute and it was found that satisfactory cutting had occurred. It may be seen that significant high frequency components are present in the graph of FIGS. 6(a) but absent from the graph of FIG. 6(b). Thus, the output signal from amplifier 513 may be used to determine if a cutting operation is proceeding in a satisfactory manner. Also, by subjecting the output signal of amplifier 513 to frequency analysis, there may be obtained a signal for controlling the speed at which a workpiece is moved during a cutting operation. The workpiece could be moved at the maximum speed at which there are no high frequency components in the output signal of amplifier 513.

The display 514 may also be used to obtain information about the focus of the beam onto workpiece 504. When the beam is accurately focused onto the workpiece, light reflected and scattered back from the workpiece will be focused into a small spot on the output end of fiber 502 by lens 503 and the output signal from amplifier 513 will be at a maximum value. When the beam is not accurately focused, the reflected and scattered light will be formed into a larger spot on the output end of fiber 502 and the output of amplifier 513 will be at a lower value. Thus, the position of lens 503 should be adjusted so as to obtain a maximum value. This may be achieved automatically by supplying the output signal of amplifier 513 to a control device 533 for motor 532. For some types of material processing operations, it may be desired to perform the process with the workpiece slightly displaced from the focus point of the laser beam.

The photodiode 510 may be sensitive to light over a narrow or a broad waveband. Alternatively, the photodiode 510 may be replaced by two or more photodetectors sensitive to light at different wavelengths.

Figure 7:
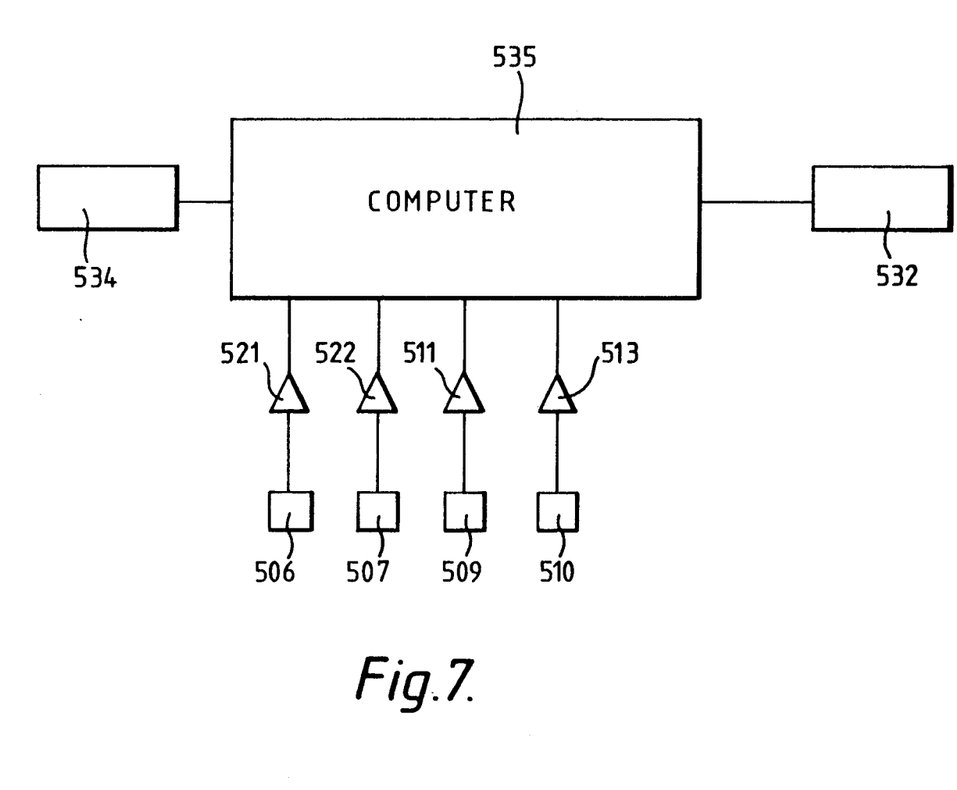
FIG. 7 is a block diagram showing how the various transducers of the laser system of FIG. 5 may be connected to its control computer.

In the laser system shown in FIG. 5, the output signals of amplifiers 511, 513, 521 and 522 are supplied to discrete displays 512, 514 and 524 and the control device 533. By way of an alternative, and as shown in FIG. 7, the outputs of these amplifiers may be provided to a central controller or computer 535 associated with laser 500. The information obtained from these output signals may be provided on one or more display devices associated with the computer. The computer 535 may also use the information obtained from these output signals for controlling the laser 500 and various devices associated with laser 500 and the material processing operation. The computer 535 may provide a signal for controlling the motor 532 which adjusts the position of lens 503. It may also produce signals for controlling a set of motors 534 which adjust the positions of mirrors 530, 531 and lens 501, and thus the alignment of the laser beam with the input end of fiber 502.

Although the transducers 10, 30 and 400 and the monitoring arrangements of FIGS. 3 and 5 have been described with reference to step-index optical fibers, these transducers and monitoring arrangements may also be used with the graded-index or other types of optical fibers. The lasers 301 and 500 may be operated in both pulsed, continuous and other operating modes.

We claim:

1. In a laser system which is performing a material processing operation on a workpiece and which includes a laser, an optical fiber comprising a core and at least one outer layer and having an input end and an output end, means for coupling the output beam of the laser with the input end of the optical fiber, and means for directing the output beam of the optical fiber onto a workpiece, a method of monitoring the state of the material processing operation, said method comprising the steps of detecting the power of light propagating in the or one of the outer layers of the optical fiber from the output end towards the input end at a position between the output end and the input end, and producing an output signal indicative of the magnitude of said power, said output signal indicating the state of the material processing operation.

2. In a laser system as claimed in claim 1, said method further comprising the step of adjusting the focus position of the output beam of the optical fiber with respect to the workpiece in accordance with said output signal.

3. In a laser system as claimed in claim 1, wherein said method comprises the steps of detecting the power of light propagating in the or one of the outer layers of the optical fiber at a position adjacent the input end of the optical fiber, producing a first signal indicative of the magnitude of said power at said position, detecting the power of the output beam of the laser between the laser and the input end of the optical fiber, producing a second signal indicative of the magnitude of said power of the laser beam, dividing said first signal by said second signal to produce a ratio signal, and adjusting the alignment of the laser beam with the input end of the optical fiber so as to minimize said ratio signal.

4. In a laser system as claimed in claim 1, said method further comprising a method of measuring the integrity of transmission of the laser beam through the core between the input and output ends of the optical fiber, said method of measuring integrity comprising the steps of detecting the power of light propagating in the or one of the outer layers of the optical fiber at a downstream position which is remote from the input end of the optical fiber with a transducer located at said downstream position, and producing an output signal indicative of the magnitude of said power at said downstream position, said output signal indicating the transmission integrity.

5. A method as claimed in claim 4, including the further step of stripping the light propagating in said outer layer out of said outer layer at an upstream position which is remote and upstream from said downstream position.

6. A method as claimed in claim 5, in which said downstream and upstream positions are respectively adjacent the output and input ends of the optical fiber.

7. A laser system for performing a material processing operation on a workpiece comprising a laser, an optical fiber comprising a core and at least one outer layer and having an input end and an output end, means for coupling the output beam of the laser with the input end of the fiber, means for directing the output beam of the optical fiber onto a workpiece, means for detecting the power of light propagating in the or one of the output layers of the optical fiber from the output end towards the input end at a position between the output end and the input end, and means responsive to said detecting means for producing an output signal indicative of said power, said output signal indicating the state of the material processing operation.

8. A laser system as claimed in claim 7, further comprising means responsive to said output signal for focusing the output beam of the optical fiber with respect to a workpiece.

9. A laser system as claimed in claim 7, wherein the means for detecting further comprises first detecting means for detecting the power of light propagating in the or one of the outer layers of the optical fiber at a position adjacent the input end of the optical fiber, means responsive to said first detecting means for producing a first signal indicative of the magnitude of said power at said position, second detecting means for detecting the power of light of the output beam of the laser between the laser and the input end of the optical fiber, means responsive to said second detecting means for producing a second signal indicative of the magnitude of said power of the laser beam, and means for dividing said first signal by said second signal to produce a ratio signal which is indicative of the alignment of the laser beam with the input end of the optical fiber.

10. A laser system as claimed in claim 7, wherein the means for determining further comprises a transducer located at a downstream position which is remote from the input end of the optical fiber and positioned to detect the power of light propagating in the or one of the outer layers of the fiber at said downstream position, and means responsive to said transducer for producing an output signal indicative of the magnitude of said power at said downstream position, said output signal indicating the transmission integrity.

11. A laser system as claimed in claim 10, including means for strippping the light propagating in said outer layer out of said outer layer at an upstream position which is remote and upstream from said downstream position.

12. A laser system as claimed in claim 11, in which said downstream and upstream positions are respectively adjacent the output and input ends of the optical fiber.

13. A laser system as claimed in claim 7, wherein the means for detecting the power of light propagating in the or one of the outer layers of the optical fiber comprises a transducer for measuring the power and direction of light propagating in the or one of the outer layers of the optical fiber, said transducer comprising another optical fiber optically coupled with said outer layer, and an optical detector positioned to detect light emitted from one end of the another optical fiber.

14. A laser system as claimed in claim 13, further comprising another optical detector positioned to detect light emitted from the other end of the another optical fiber.

15. A laser system as claimed in claim 14, in which said transducer further comprises a mass of material in contact with said outer layer of the first optical fiber at a preset position, and said second optical fiber being embedded in said mass of material.

16. A laser system as claimed in claim 7, wherein the means for detecting the power of light propagating in the or one of the outer layers of the optical fiber comprises a transducer mounted on said optical fiber at a position between the output end and the input end for measuring the power of light propagating in the or one of the outer layers of the optical fiber, said transducer comprising another optical fiber aligned and coupled with the or one of the outer layers of the optical fiber, first and second optical detectors positioned to detect light emitted from first and second ends of the another optical fiber, first signal producing means responsive to said first detector for producing an output signal indicative of the power of light propagating in the or one of the outer layers of the optical fiber at the position of the transducer from the output end of the optical fiber towards its input end, and second signal producing means responsive to the second optical detector for producing an output signal indicative of the power of light propagating in the or one of the outer layers of the optical fiber at the position of the transducer from the input end of the optical fiber towards its output end.

17. A laser system as claimed in claim 7, further comprising a controller for the laser system, another detecting means for detecting the power of light propagating in the or one of the outer layers of the optical fiber from the input end towards the output end at a position which is downstream and remote from the input end of the optical fiber, said another detecting means producing another output signal, and further detecting means for detecting the power of light propagating in the or one of the outer layers of the optical at a position adjacent the input end of the optical, said further detecting means producing a further output signal, said output signal and said another and further output signals being supplied to the controller for the laser system.

* * * * *